United States Patent [19]

Anders

[11] 4,389,037
[45] Jun. 21, 1983

[54] DOUBLE DISC GATE VALE WITH REPLACEABLE SPACER RING

[75] Inventor: Ronald J. Anders, Raleigh, N.C.

[73] Assignee: Rockwell International Corporation, Pittsburgh, Pa.

[21] Appl. No.: 159,017

[22] Filed: Jun. 13, 1980

Related U.S. Application Data

[63] Continuation-in-part of Ser. No. 605,277, Aug. 18, 1975, abandoned.

[51] Int. Cl.$^3$ ............................................... F16K 3/12
[52] U.S. Cl. ..................................... 251/327; 251/326
[58] Field of Search ................................ 251/327, 326

[56] References Cited

U.S. PATENT DOCUMENTS 3,387,818  6/1968  Siepmann ........................... 251/327
3,695,578  10/1972  Walther ........................... 251/327 X

*Primary Examiner*—Arnold Rosenthal

[57] ABSTRACT

A gate valve includes a pair of identically shaped tapered discs defining a tapered self-locking axially translatable gate wherein each disc has an annular hardened seating surface which engages the mating surfaces on the valve body adjacent the flow ports. Tongues on the sides of the discs ride in vertical grooves on the valve body as the gate travels between a raised open and a lowered closed position. The discs are separated by an annular spacer ring of substantially smaller diameter than the seating surfaces surrounding an interlocking segmented hub formed on the inner juxtaposed surfaces of the discs, the arrangement being such that the spacer ring can be sized to establish an overall gate width which will ensure that the seating surfaces are making proper sealing engagement with the valve seats with the diametral differences increasing the disc flexibility. The spacer ring can be replaced by an appropriately sized spacer ring to compensate for thickness reduction in resurfacing the seating surfaces.

12 Claims, 8 Drawing Figures

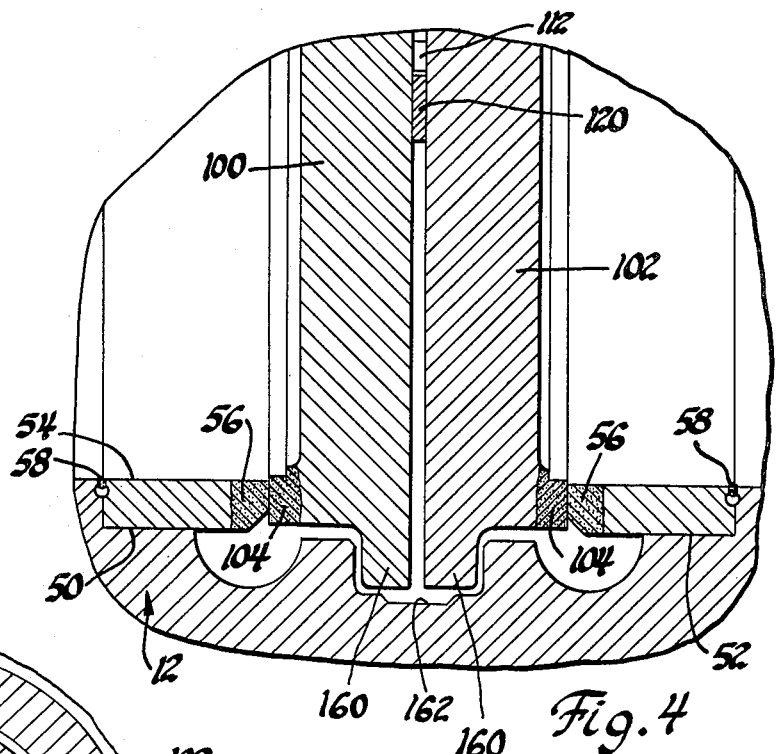
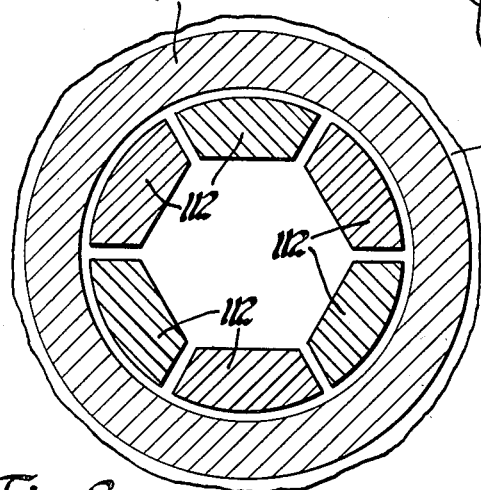
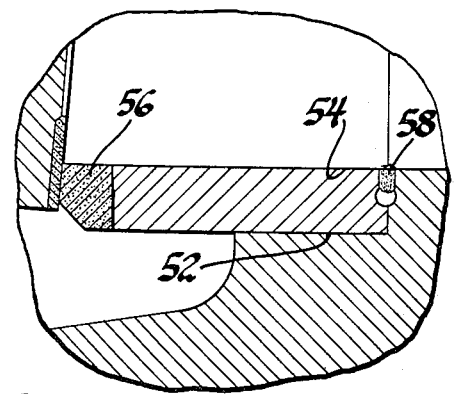
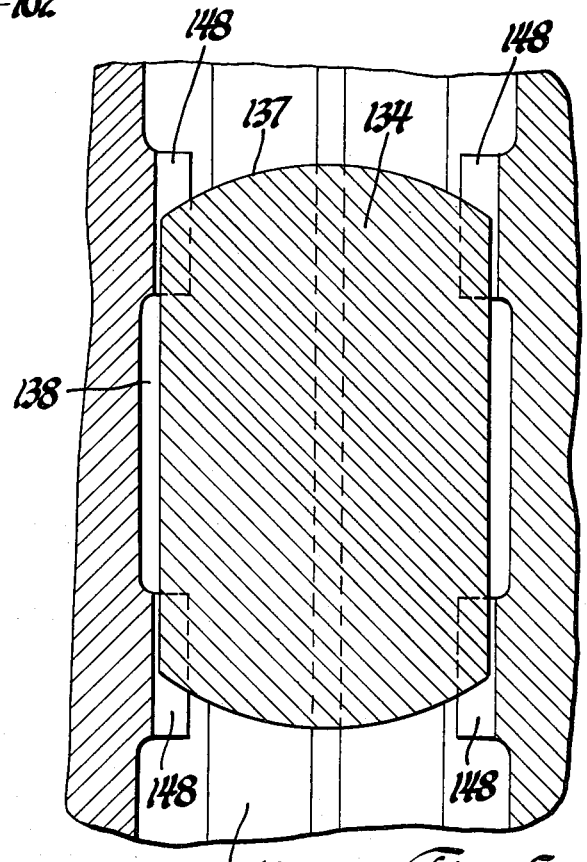
Fig. 4
Fig. 2
Fig. 3
Fig. 5

DOUBLE DISC GATE VALE WITH REPLACEABLE SPACER RING

BACKGROUND OF THE INVENTION

This application is a continuation-in-part application of my copending application, Ser. No. 605,277, filed on Aug. 18, 1975.

This invention relates to gate valves and in particular to a gate valve construction using a split gate construction.

Double disc gates have been proposed for gate valves because of certain inherent functional and manufacturing advantages. Such constructions, in view of the larger freedom of movement of the independent discs, can conform to larger manufacturing variations in the discs and the valve seats while, at the same time, provide complete sealing despite distortion of the seats due to differential heating and cooling rates and system stresses. The present invention improves upon prior double disc constructions by providing a unit which has additional manufacturing, performance and reliability features.

SUMMARY OF THE INVENTION

The gate of the present valve comprises two juxtaposed identically formed discs. In assembly, the discs are spaced a predetermined distance apart by an annular spacer ring, retained in place by means of projecting capturing surfaces. The individual discs allow independent axial flexing such that, despite dimensional and angular variations between the respective seating surfaces and the valve seats, the downstream seat can independently conform to its seating surface. The spacer ring is peripherally bounded, and thereby captured, internally in one form and externally in another form, by projecting circumferential surfaces. The spacer ring, more importantly, establishes the desired overall width of the gate. In this manner, the spacer ring can be appropriately independently sized and selected to accommodate various tolerances in the individual disc while still providing a predetermined overall width necessary to ensure sealing mating of the seating surfaces in the valve closed position.

Additionally, when the valve seats and seating surfaces become scored or otherwise damaged such that regrinding is necessary, the amount of removed material can be compensated for by increasing the width of the spacer ring to once again re-establish the desired relationship between the seating surfaces in the fully closed position. The spacer ring has a substantially smaller diameter than the seating surfaces to increase the disc deflection capability.

The discs additionally include slots transverse to the flow passage which capture a T-head end of a non-rotating valve stem. Because the disc or wedge is larger at the top than the bottom, sufficient material exists for forming cavities transverse to the valve seating surfaces while being located radially therebetween. In contrast to conventional gate valves wherein the slot for the T-head is parallel to the fluid flow, the entire stem head retaining section is exterior of the valve seating surfaces, this adds considerably to the height of the valve and, as a consequence, the present design is considerably more compact. Further fracture of the stem presents the possibility that the stem end will enter the flow line. This possibility is precluded by the present captured design. The individual gate discs ride up and down the valving control chamber by cooperation between guide tongues formed at the sides of the discs and recessed guide rails formed on the sides of the valve body. This provides for guided controlled axial movement of the gate assembly between the open position and the closed position. With the aforementioned stem connection oriented perpendicular to the flow line, rather than parallel to it, there are no reactive forces on the discs causing relative rotation of the two valve discs. Accordingly, no pin connection or the like is necessary.

The above and other features of the present invention will be apparent to those skilled in the art upon reading the following detailed description, reference being made to the drawings in which:

FIG. 2 is a view taken along line 2—2 of FIG. 1, showing the interlocking hub and spacer ring between the valve discs;

FIG. 3 is a fragmentary view showing the assembly of the seat ring to the valve body and its engagement with the seating surface on the gate discs;

FIG. 4 is a view taken along line 4—4 of FIG. 1, showing the tongue and groove guides between the gate and the valve body;

FIG. 5 is an enlarged fragmentary view taken along line 5—5 of FIG. 1, showing the stem head connection at the valve discs;

DESCRIPTION OF THE PREFERRED EMBODIMENTS

Figure 1:
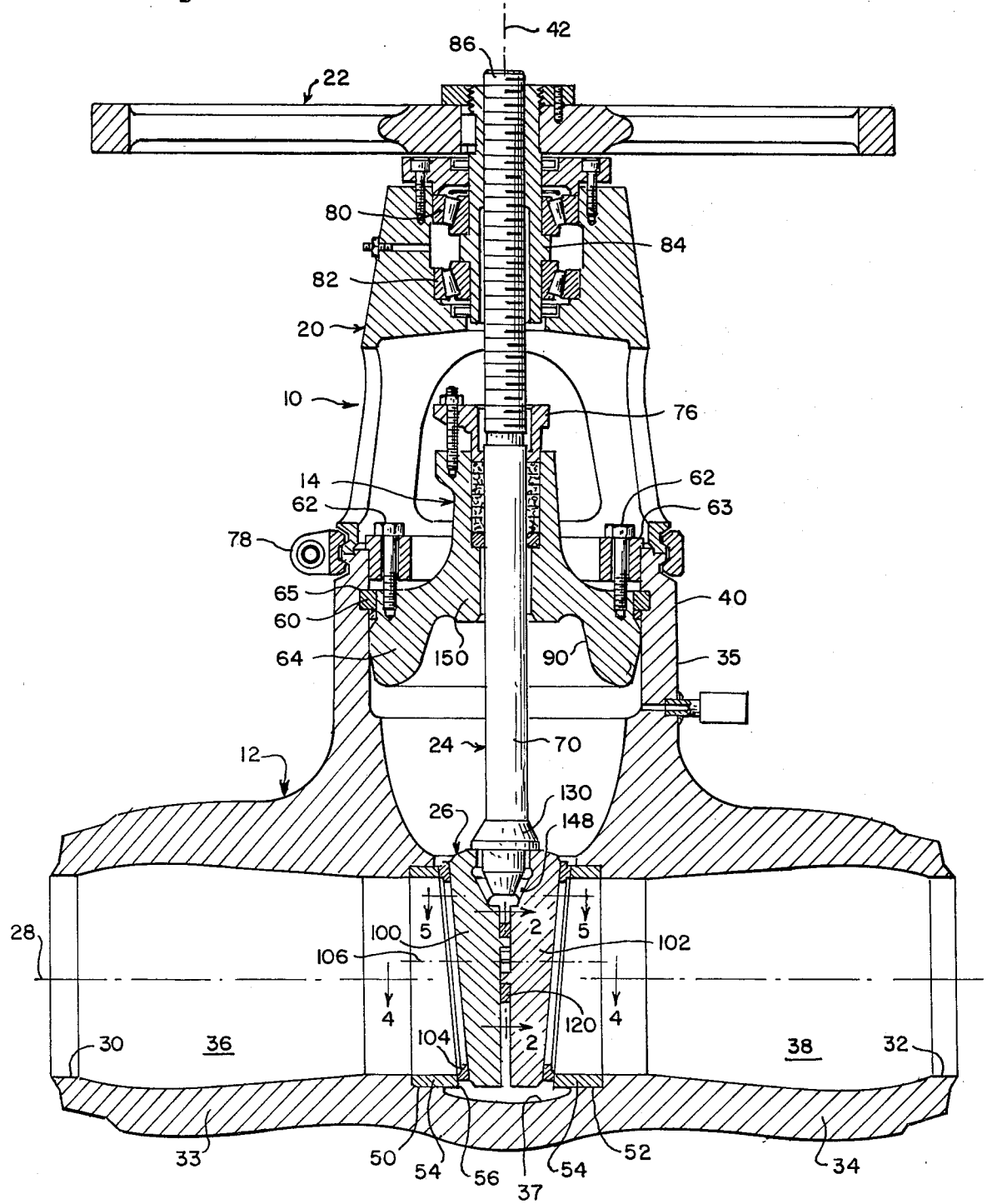
FIG. 1 is a cross-sectional view of a gate valve made in accordance with the present invention, showing the two piece gate in the closed position.

Referring to FIG. 1, there is shown a gate valve 10 made in accordance with the present invention of the type used for high pressure fluid applications such as electric power generation systems of either the fossil or nuclear type. Such a gate valve is usable in a product line ranging between nominal sizes of 1½ inches and 42 inches and in ANSI pressure classes of 600, 900, 1500, 2500 and 4500.

The gate valve 10 generally comprises a valve body 12, a bonnet assembly 14, a yoke assembly 20 and a handwheel assembly 22. As hereinafter described, rotation of the handwheel assembly 22 raises and lowers an internal stem assembly 24 and a double disc gate 26 to open and close a fluid passage extending through the valve body 12 along axis 28 between a left hand outlet 30 and a right hand outlet 32. The direction of flow is dependent on the system and the present equally facilitates flow in either direction.

The valve body 12 is a generally T-shaped cast carbon steel construction and includes outlet sections 33 and 34 and a control section 35 mutually intersecting at a valving chamber 37 occupied by the gate 26. The section 33 includes the aforementioned outlet 30 and a flow passage 36. The section 34 includes the aforementioned outlet 32 and a flow passage 38. The passages 36 and 38 are co-axially disposed along the flow axis 28. The end of control section 35 defines an upwardly opening cylindrical section 40 having an operational axis 42 which perpendicularly intersects the flow axis 28.

The inner ends of the sections 33 and 34 are formed with counterbores 50 and 52 which contain cylindrical seat rings 54. The seat rings 54 are provided with hardened annular seats 56 (FIG. 4). The seats 56 are formed in planes inclined five degrees with respect to the operational axis 42. The planes of the seats 56 are symmetrically disposed with respect to the axes 42 and 48. The seat rings 54 are fixed to the inner surface of the valve body 12 at continuous circumferential welds 58.

The bonnet assembly 14 is retained at the upper end of the section 40 on the outer end of the section 35 by means of a split retainer ring 60. Bolts 62 clamp the ring 60 to draw the outer flange 63 of the bonnet 64 upwardly against the retainer ring retained in a peripheral circumferential channel section 65. The bonnet 64 is centrally apertured and receives the stem 70 of the assembly 24. The handwheel assembly 22 is attached at its outer end to the stem assembly 24 and at its lower end to the gate 26. A packing gland assembly 76 seals the periphery of the stem 70.

The yoke assembly 20 is retained at the top of section 35 by means of a split lock ring 78. A pair of roller bearings 80 and 82 have their outer races received in counterbores at the upper end of the yoke 20 and have their inner races fixedly carried at opposite ends of rotatable bushing 84 which has an internal thread engaging the threaded end 86 of the valve stem 70. The bushing 84 is keyed to the handwheel 22 such that rotation of the handwheel 22 rotates the bushing 84 to raise and lower the stem 70 through the packing assembly 76, thereby raising and lowering the gate 26 between the illustrated lowered closed position and a raised opened position as guided by the cooperation between guide tongues formed at the sides of the discs and the grooves between guide rods formed at the sides of the body (FIG. 4). In the open position the gate 26 is housed within a generally hemispherical depression 90 in a lower surface of the bonnet 64 so as to reduce the vertical height of the valve.

The gate 26 comprises two identically formed gate discs 100 and 102. In assembly the discs 100 and 102 have opposed seating surfaces hereinafter described which sealingly engage the seats 56 of the seat rings 54 to prevent migration of fluid past the sealing interfaces. Each disc has a projecting hardened seating surface 104 which is ground flat in a plane inclined with respect to its planar back surface at an angle equal to the inclination of the seat 56 or, in other words, five degrees with respect thereto. The outer diameter of the surface 104 is slightly larger than the surface 56. In initial assembly, in the fully seated closed position, the overall thickness of the wedge is sized such that the axis 106 of the wedge assembly is located above flow axis 28. As the seating surfaces wear, the axis 106 will shift downwardly and will maintain complete sealing contact until the outer diameter of surface 104 is unacceptably below the outer diameter of seat 56 at the upper center thereof.

Figure 8:
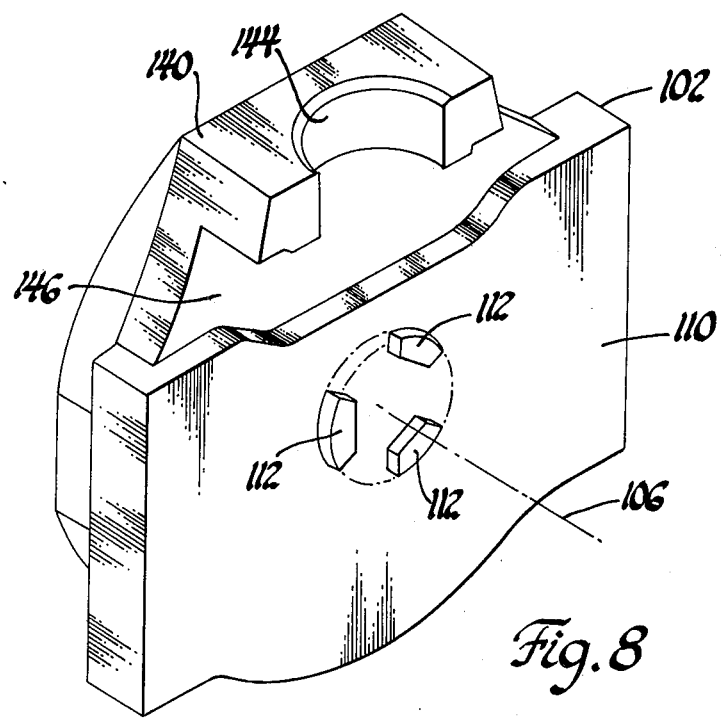
FIG. 8 is an enlarged perspective view of a valve disc illustrating the stem head slot and the segmented locating hub.

Referring to FIG. 8, the rear surface 110 of the gate disc 102 is substantially planar being interrupted only by three projecting segmented lugs 112 which form means for capturing and retaining the spacer ring and are equally circumferentially disposed with respect to the axis 106. This arrangement provides an uninterrupted datum surface for convenient accurate machining of the seating surface 104 and other critical machine operations on the individual discs. In assembly, the lugs 112 interfit with corresponding lugs on the juxtaposed gate disc to form a segmented annular hub as shown in FIG. 2 having a projecting exterior peripheral cylindrical surface. The sides of the individual lugs are formed so as to provide a circumferential spacing with the adjoining lugs such that limited relative movement is accommodated without a corresponding interaction. The segmented hub captures an annular spacer ring 120. The spacer ring 120 has a predetermined thickness which, in combination with the thickness of the individual discs, establishes an overall width for gate 26 sufficient to ensure proper seating of the gate discs against the seats. The ring 120 is substantially smaller in diameter than the seating surfaces to increase the deflection of the latter under pressure and stem loading.

Should excessive wear occur at the seating interfaces or should any of the seating surfaces become scored or otherwise damaged during operation, the gate must be removed and the seating surfaces refinished. Inasmuch as this will result in the removal of metal, there would be excessive downward travel of the gate past the point where sealing contact is established. This would normally necessitate the replacement of the entire gate. In the present instance, however, only the spacer ring 120 must be replaced. The only replacement requirement is that the thickness of the spacer ring compensate for material reduction occasioned by the machining operation so as to reestablish the desired operational relationships between the seating surfaces.

Figure 9:
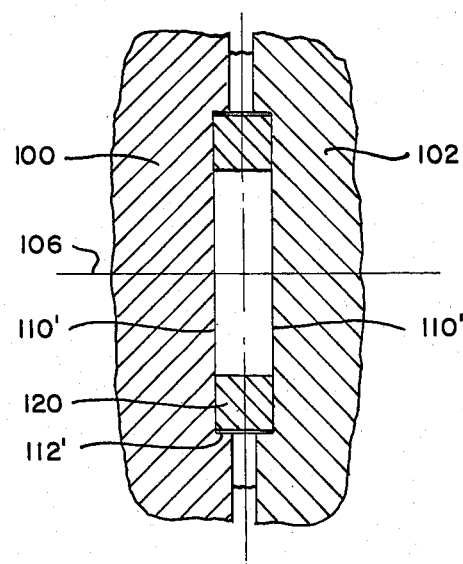
FIG. 9 is a fragmentary cross sectional view of the discs spaced by the spacer ring retained by the peripheral surface of counterbores in the discs.
Figure 10:
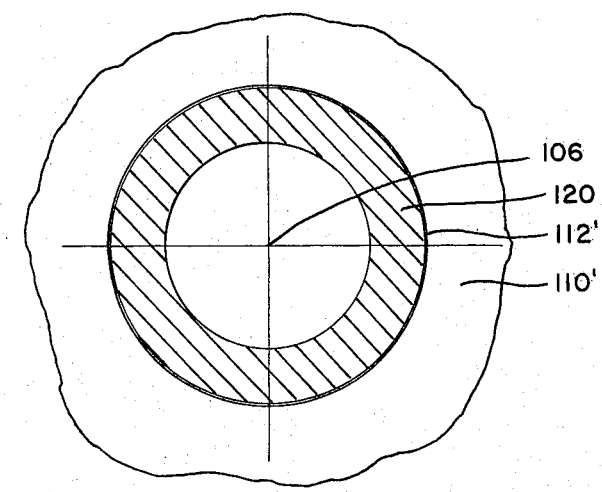
FIG. 10 is a view taken along line 10—10 of FIG. 9.

In a modification of the means for capturing and retaining the spacer ring shown in FIGS. 9 and 10, the planar rear surfaces comprise the circular bases 110' of counterbores 111' formed coaxial with the axis 106 in the mutually facing opposed sides of the discs 100, 102. The spacer ring 120 has a predetermined thickness which, in combination with the thickness of the individual discs as measured from the circular bases 110', establishes an overall width for the gate sufficient to ensure proper seating of the gate discs against the seats. The cylindrical side wall 112' of the counterbore forms an inwardly facing peripheral surface which circumferentially bounds and thereby captures the outer peripheral surface of the spacer ring 120. The diameter of the side wall is slightly larger than the outer diameter of the spacer ring such that the latter is received with a slight radial clearance therewithin. The combined depths of the counterbores is less than the thickness of the spacer ring such that limited relative movement is accommodated without a corresponding interaction. The ring 120 is substantially smaller in diameter than the seating surfaces to increase the deflection of the latter under pressure stem loading.

Figure 6:
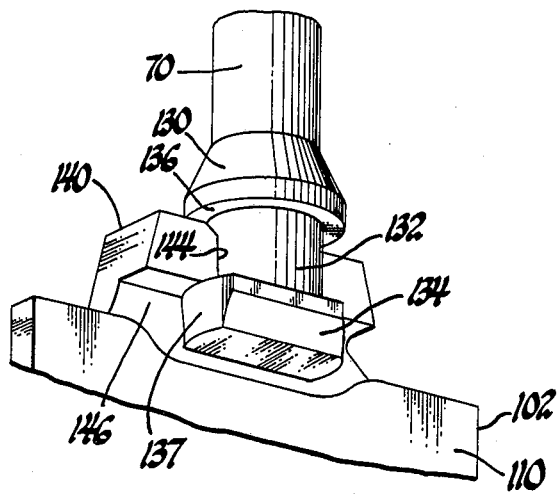
FIG. 6 is an enlarged fragmentary perspective view of the stem head in assembly with the valve discs.
Figure 7:
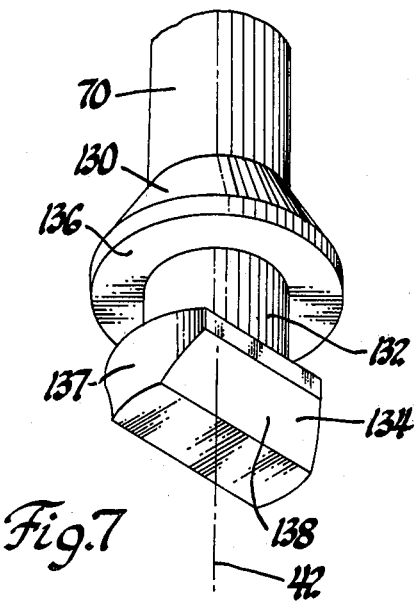
FIG. 7 is an enlarged perspective view of the stem head configuration.

The lower end of the stem 70 is provided with a T-head construction comprising an actuating roller 130, a cylindrical neck 132 and a T-wedge 134. As shown in FIGS. 5, 6 and 7, the collar 130 has a substantially frustoconical surface provided with a lower annular bearing surface 136. The T-wedge 134 has outer faces 137 substantially identical in diameter to the outer diameter of the collar 130 and inclined side surfaces 138 symmetrically disposed with respect to the axis 42 to thereby form a downwardly tapering wedge shaped section.

As shown in FIGS. 6 and 8, the individual discs 102 include an upper bearing surface 140 engageable by the surface 136, a semi-circular axial groove 144 adapted to loosely surround the neck 132 and a wedge shaped transverse slot 146 extending transverse to the axes 106 and 42. The slot is within the confines of the seating areas of the gate, resulting in a lowered profile. Pairs of raised inclined pads 148 are formed at the sides of the slots 146 and operationally have a slight clearance with respect to the inclined surfaces 138 of wedge 134. In assembled relationship as shown partially in FIG. 6, the stem head end is received within the slot 146 and the other half of the gate assembly is received thereover such that the wedge 134 is captured within the confines of the slots 146. The transverse slot design affirmatively retains the stem end and will permit entry thereof to the fluid line in the event of stem fracture.

As shown in FIG. 4, the gate discs 100 and 102 have tongue portions 160 projecting from either side into a recess 162 formed on the interior of opposite walls of chamber 37 whereby the gate in its entirety is guided during opening and closing movement of the gate and the gate discs are prevented from separating.

Due to the wedge shape of the gate 26, the force transmitted by the stem assembly 24 to the seating surfaces is greatly magnified, resulting in a large sealing force between the mating seating surfaces. The independent flexure of the seating surfaces accommodated by the split wedge design allows the individual seating surfaces to flex and conform to the mating surfaces under fluid pressure without a corresponding reaction by the opposite discs. It also substantially equalizes the seating forces on the individual seating surfaces. Accordingly, when it is desired to move the gate assembly to the opened position, the upper surface of the T-head 134 engages the undersurfaces of the slot 146 and, inasmuch as the discs are independent, the flexure thereby provided relieves the seating force sufficiently to disengage the seating surfaces.

The gate assembly has been translated upwardly through rotation of the handwheel 22 and upward movement of the stem 24 until such time as the conical back seat 130 of the stem 70 engages the back seat 150 on the bonnet 64 the tongue and grooves and the projecting peripheral surfaces preventing axial separation of the discs and providing axial capturing of the spacer ring. Thereat flow through the passages 36,34 is substantially unrestricted.

It should be noted that only during the final closing and initial opening movement of the gate is there any mechanical or pressure loaded sliding movement of the seating surfaces across the seats, thereby, resulting in reduced cycle wear to these surfaces.

Although only the above forms of this invention have been shown and described, other forms will be readily apparent to those skilled in the art. Therefore, it is not intended to limit the scope of this invention by the embodiments selected for the purpose of this disclosure but only by the claims which follow.

What is claimed is:

1. A gate valve comprising: a valve body having flow passages communicating with a central valving control chamber; valve seats in the valve body at the ends of the flow passages adjacent the control chamber; a two piece gate movable between an open position and a closed position by an external stem assembly operably connected to said gate; a seating surface formed on one side of each of said gate pieces sealingly engageable with its respective said valve seat in the closed position when opposed surfaces respectively of the other side of each of said gate pieces are spaced a predetermined distance apart; a single rigid spacer member remote from said stem assembly having end surfaces respectively engaging said opposed surfaces and having a thickness therebetween equal to said predetermined distance; projecting capturing means on each of said gate pieces bounding a peripheral wall of said spacer member and projecting from said opposed surfaces an effective combined distance less than the thickness of the spacer member; said spacer member being circular and having a circular peripheral wall which is the outer circumferential wall of said member and is bounded by said projecting capturing means; said spacer member having a central circular opening formed therein; and guide means preventing separation of the pieces during gate movement and disengagement of the capturing means.

2. A gate valve comprising: a valve body having a pair of flow passages coaxially disposed along a flow axis, said flow passages having inner ends communicating with a central valving control chamber and outer ends connectable at a fluid flow line, said control chamber having an operational axis normal to the flow axis; circular valve seats susceptible to wear and damage surrounding the inner ends of the flow passages adjacent the control chamber, said valve seats being disposed in planes perpendicular to a plane including said flow axis and said operational axis and downwardly converging toward the operational axis and diametrically opposed with respect thereto; a two piece wedge shaped gate, each piece of said gate being identically shaped and having a circular front seating surface inclined parallel to the valve seat so as to be sealingly engageable therewith in a closed position with a planar rear surface thereon transverse to the flow axis, the pieces of the gate having said planar rear surfaces in parallel spaced relation in assembly; a stem supported on the valve body extending along the operational axis into the control chamber and operatively connected to the gate for moving the gate along the operational axis, said stem moving the gate between an upper open position and a lower closed position; a single rigid annular spacer member being loosely retained between the pieces at a location remote from said stem and having opposed parallel planar bearing surfaces spaced a predetermined distance apart, one of said bearing surfaces directly engaging the rear surface of one of the gate pieces, the other of said bearing surface directly engaging the rear surface of the other of said gate pieces thereby spacing the rear surfaces said predetermined distance apart to space the pieces at an overall width which will axially position the gate along the operational axis in the closed position to assure full sealing contact between the sealing surfaces and the valve seats, said spacer member being of substantially smaller diameter than the seating surfaces to increase the flexibility of the discs thereabout, the material removed from the seats and the seating surfaces during repair thereof for said damage and wear being compensated for by replacement of the original spacer member with a replacement spacer member having a larger predetermined distance sufficient to establish said overall width and related axial position for the gate; arcuate surfaces adjacent the rear surfaces of the pieces projecting therefrom a combined length which is less than said predetermined width of said spacer member, said arcuate surfaces at least partially bounding the sides of the spacer member to radially restrain the spacer member in assembly with sufficient clearance therebetween to permit limited relative movement between the pieces without interaction with the spacer member; and guide means preventing axial separation of the pieces during gate movement to insure that the arcuate surfaces radially capture the spacer member.

3. The gate valve recited in claim 2 wherein each of said planar rear surfaces includes a base of a counterbore formed in the piece, and said arcuate surfaces include the cylindrical side walls of the counterbores which circumferentially bound an outer periphery of said sides of the spacer member.

4. The gate valve recited in claim 3 wherein said spacer member is an annular ring with a central circular opening.

5. A gate valve comprising: a valve body, a central chamber within said body; inlet and outlet flow passages communicating with said chamber; valve seats surrounding the ends of the flow passages adjacent the chamber; a two piece gate member; means for mounting said gate pieces on said stem assembly for limited axial movement with respect to the axis of said flow passages and each other whereby the spacing between said gate pieces may be varied; a seating surface on one side of each of said gate pieces sealingly engageable with a respective valve seat in the closed position when said gate pieces are spaced a predetermined distance apart; retaining means fixed on opposed surfaces of each of said gate pieces for replaceably receiving and retaining between said gate pieces replaceable spacer members of differing axial dimension whereby the spacing between said gate pieces may be adjusted to a fixed predetermined amount solely in accordance with the axial dimensions of said spacer members; a unitary rigid spacer member of preselected axial dimension retained in place between said gate pieces by said retaining means, the axial dimension of said spacer member being such as to space said gate pieces said predetermined distance.

6. The gate valve defined in claim 5 wherein said spacer member is an annulus having planar side walls.

7. A gate valve comprising: a valve body, a central chamber within said body; inlet and outlet flow passages communicating with said chamber; valve seats surrounding the ends of the flow passages adjacent the chamber; a two piece gate member; means for mounting said gate pieces on said stem assembly for limited axial movement with respect to the axis of said flow passages and each other whereby the spacing between said gate pieces may be varied; a seating surface on one side of each of said gate pieces sealingly engageable with a respective valve seat in the closed position when said gate pieces are spaced a predetermined distance apart; aligned juxtaposed recessed formed respectively in opposed surfaces in said gate pieces for replaceably receiving and retaining between said gate pieces replaceable spacer members of differing axial dimension whereby the spacing between said gate pieces may be varied in accordance with the axial dimensions of said spacer members; a unitary rigid spacer member of preselected axial dimension retained in place between said gate pieces by said retaining means, the axial dimension of said spacer member being such as to space said gate pieces said predetermined distance.

8. The gate valve defined in claim 6 wherein said retaining means is comprised of spaced interfitting segmental projections formed respectively on said opposed surfaces and which project into the opening bounded by the inner diameter of said annulus.

9. The gate valve defined in claim 8 wherein said projections cooperate to form a circumferential surface the diameter of which is substantially equal to the diameter of the inner diameter of said annulus.

10. The gate valve defined in claim 5 together with guide means limiting separation between said gate pieces during movement of said gate member between open and closed position.

11. The gate valve defined in claim 10 in which said guide means is separate from said valve seats.

12. The gate valve defined in claim 6 wherein said spacer member is of circular configuration having planar side walls.

* * * * *